United States Patent
Parent et al.

(10) Patent No.: US 9,993,755 B2
(45) Date of Patent: Jun. 12, 2018

(54) CLOSURE FOR LEAF FILTER IN ALUMINA PRODUCTION

(71) Applicant: SEFAR BDH INC., Saguenay (CA)

(72) Inventors: Luc Parent, Saguenay (CA); Yan Brochu, Saguenay (CA)

(73) Assignee: SEFAR BDH INC., Saguenay QC (CA)

( * ) Notice: Subject to any disclaimer, the term of this patent is extended or adjusted under 35 U.S.C. 154(b) by 374 days.

(21) Appl. No.: 14/894,730

(22) PCT Filed: Jun. 5, 2014

(86) PCT No.: PCT/CA2014/050518
§ 371 (c)(1),
(2) Date: Nov. 30, 2015

(87) PCT Pub. No.: WO2014/194425
PCT Pub. Date: Dec. 11, 2014

(65) Prior Publication Data
US 2016/0121247 A1 May 5, 2016

Related U.S. Application Data

(60) Provisional application No. 61/831,246, filed on Jun. 5, 2013.

(51) Int. Cl.
*B01D 35/30* (2006.01)
*B01D 29/27* (2006.01)
*B01D 29/39* (2006.01)

(52) U.S. Cl.
CPC ............ *B01D 35/30* (2013.01); *B01D 29/27* (2013.01); *B01D 29/39* (2013.01)

(58) Field of Classification Search
CPC ......... B01D 35/30; B01D 29/27; B01D 29/39
See application file for complete search history.

(56) References Cited

U.S. PATENT DOCUMENTS

2,551,312 A * 5/1951 Bokich .................. B01D 29/27
210/346
3,481,479 A * 12/1969 Terhune ................. B01D 29/39
210/484

(Continued)

FOREIGN PATENT DOCUMENTS

CA      495229 A    8/1953
CA      646598 A    8/1962

(Continued)

*Primary Examiner* — Krishnan S Menon
*Assistant Examiner* — Waqaas Ali
(74) *Attorney, Agent, or Firm* — Eversheds Sutherland (US) LLP

(57) ABSTRACT

An edge closure system is presented herein wherein a portion of the closure edge of the filter bags leading to the outlet pipe aperture are provided with mating snapping closures, allowing to sealingly close the length of the edge of the fabric leading to the outlet pipe aperture simply by engaging the male and female components of the snapping closures. Moreover, an outlet pipe closure system is also presented herein using a combination of a tongue mounted internally to one of the sides of the fabric forming the bag in a manner to be wrappable around at least a corresponding portion of the outlet pipe, and a fabric hood mounted externally and overlapping both sides of the bag at the outlet pipe aperture, which cooperates with the tongue to seal the interface between the outlet pipe and the bag when held in position.

18 Claims, 6 Drawing Sheets

(56) References Cited

U.S. PATENT DOCUMENTS 3,784,019 A * 1/1974 Gordon, III ........... B01D 46/06
                                                                                                      210/486
4,789,474 A * 12/1988 Gaudfrin ................ B01D 29/39
                                                        210/333.01

FOREIGN PATENT DOCUMENTS

| CA | 938228 | 12/1973 |
| CA | 1304695 C | 7/1992 |
| CA | 2711216 C | 8/2010 |
| DE | 2310708 A1 | 9/1974 |
| WO | 02100513 A1 | 12/2002 |

* cited by examiner

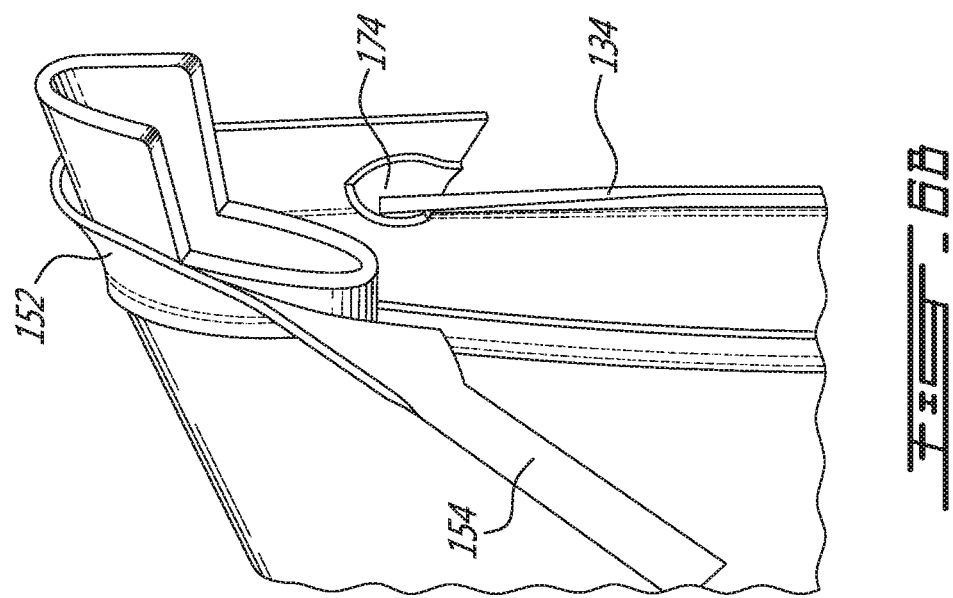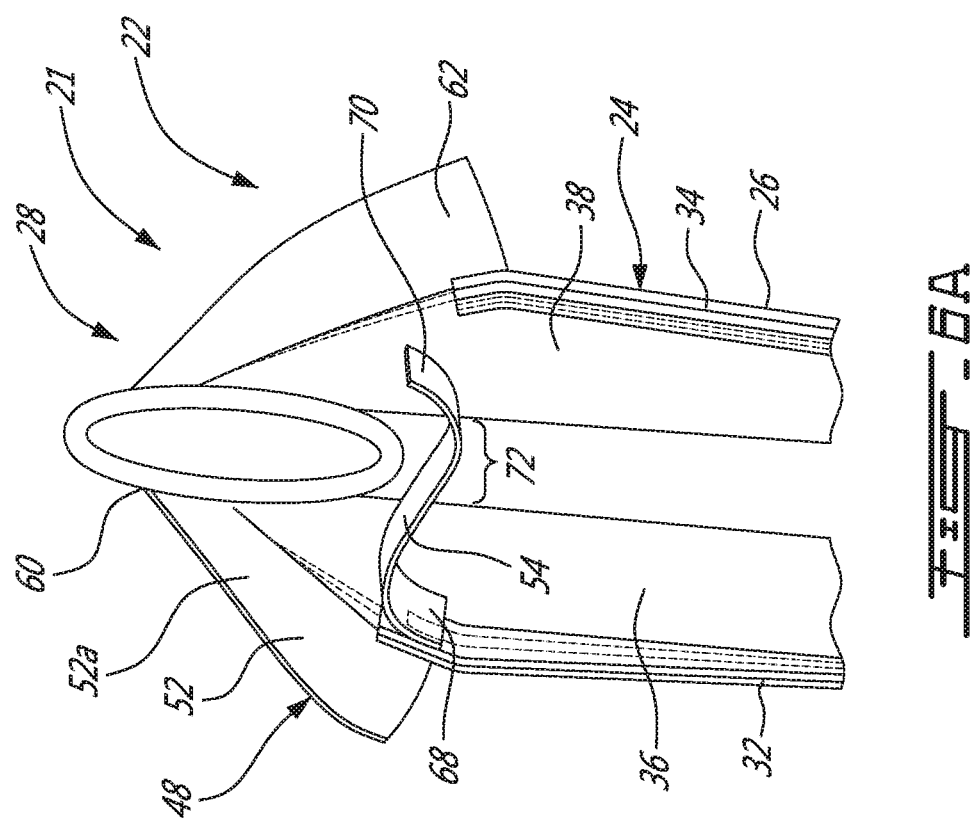

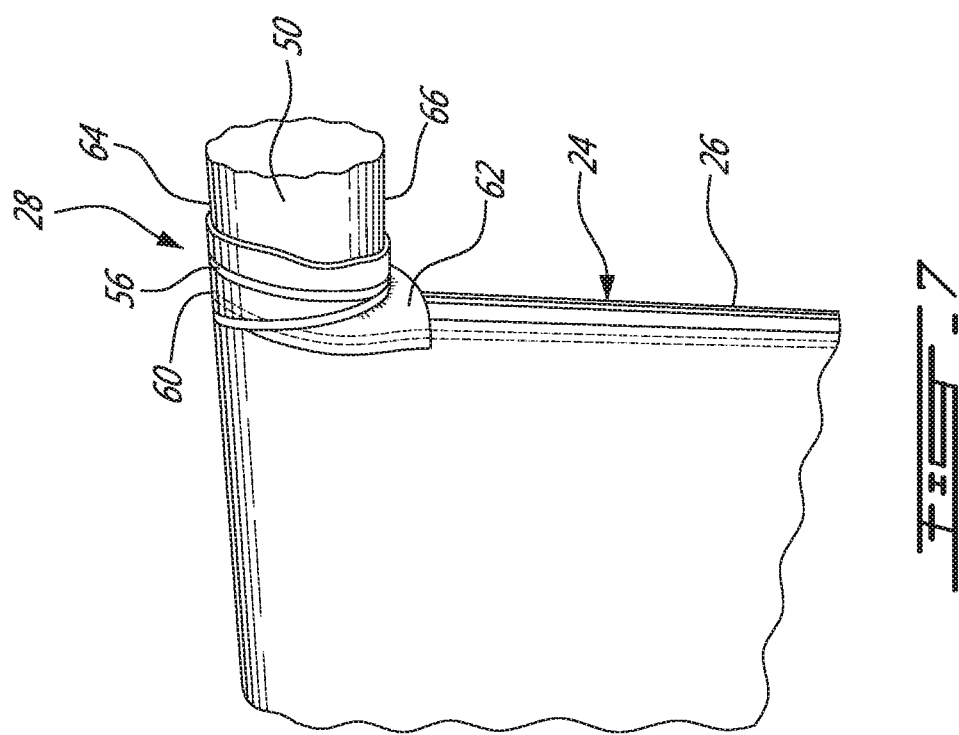

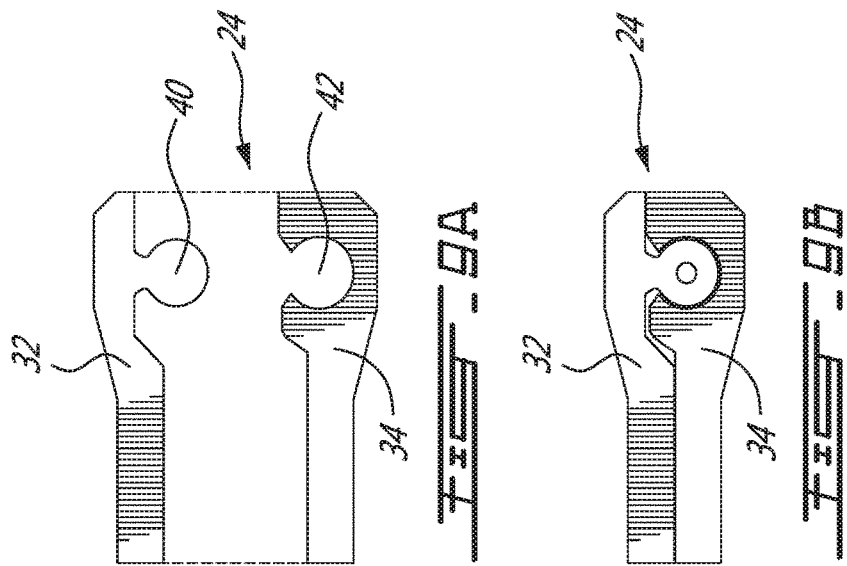
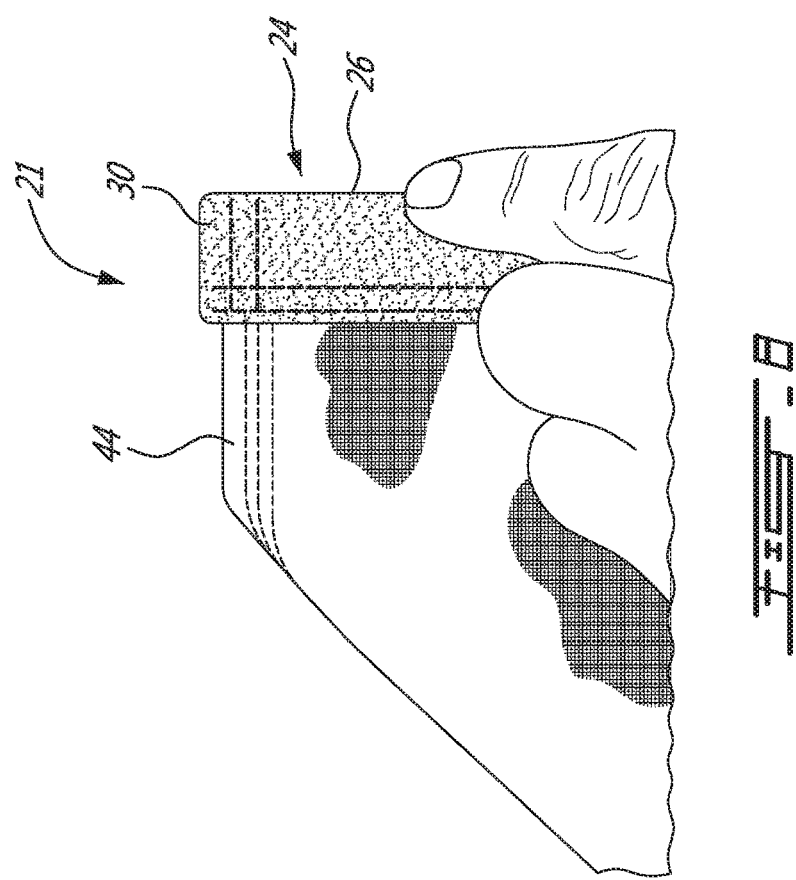

CLOSURE FOR LEAF FILTER IN ALUMINA PRODUCTION

FIELD

The improvements generally relate to the field of alumina production, and more specifically to a filter bag for leaf filters used in the Bayer process.

BACKGROUND

In 2012 the world aluminum oxide production reached and exceeded 70M metric tons. Aluminum oxide, which is also called alumina, is mainly used as a feedstock material for aluminum metal production. The main source of alumina is an ore called bauxite which contains roughly between 25-75% weight content of aluminium oxide. The ore cannot be used directly by smelters and must be enriched to reach a 99% weight content of aluminium oxide. It is known to increase the alumina content with the Bayer process. In typical applications, the bauxite is grinded, mixed with a solution containing between 200-300 g per liter of sodium hydroxide and heated under pressure at a temperature above 140° C. At these conditions of ore digestion, the alumina compounds are solubilised while typical impurities like iron oxides, titanium oxides and others, are not. All of these impurities will remain in the liquid in the form of solid suspension. After the digestion process, the solution containing alumina and impurities are cooled to atmospheric boiling point and then subjected to two solid-liquid separation steps. The addition of flocculent into a tank called "deep thickener" is the first separation step. Under the flocculent effect, the agglomerated particles settle at the bottom of the tank where they are pumped out. The top clear part of the solution is now almost free of solid impurities with only traces of them still in the solution. The overflow of clear solution is sent to the second step of filtration where the traces of impurities are removed. A concentration of impurities of less than 5 mg per liter can remain after filtration.

It was traditionally known to perform the latter filtration step, often referred to as security filtration, by leaf filters. In the last several years, many new alumina production plants are engineered with a different type of filter referred to as channel filters. Nonetheless, an impressive amount of plants still use leaf filters today.

An example leaf filter is shown in FIG. 1, where the leaf filter is shown during a cleaning step, with a cylindrical shell of the filter slid lengthwisely, exposing the internal structure of the leaf filter which houses a plurality of 'leafs' (typically about 15-25) of various sizes engineered to adapt to the space available in the cylindrical shell.

The leafs of the filter each includes a mesh frame having a steel structure supporting a steel mesh, such as shown in FIG. 2, which is covered by a filtration fabric provided in the form of a bag such as shown in FIG. 3 for use. During operation, the cylindrical shell is slid into position to close the vessel, and the solution intended to be filtered is pumped into it. When the vessel is full, the pressure rises due to a pumping action, and the solution flows through the fabric, across the mesh, and the filtrate is extracted through an outlet pipe. The purified solution, full of solubilised alumina, is ready for production of solid alumina. Filtration by the leaf springs leads to formation of a rock-solid accumulation known as scale on the bags. Accordingly, the bags are consumable items which are subject to regular replacement, typically at each 4-6 weeks. A typical leaf filter can require 250-500 square meters of fabric to cover all of the 15-25 leafs. A typical plant has at least 5 leaf filters, and can thus use about 1000 filter bags per year. Many plants have 10 to 15 filters and can thus use 2000 to 3000 filter bags per year.

Although the known leaf filters were satisfactory to a certain degree, they met certain limitations. For instance, in typical production plants, a significant amount of leafs were detected to have leaks after only a few hours of operation. These leafs were then closed for the remainder of the 4-6 weeks of operation of the leaf filters, leading to loss of production and waste of fabric. Moreover, the process of replacing the bags was labour-intensive, especially in a context where a significant amount of scale needed to be removed to allow extracting the steel frame from the used bags. Henceforth, there remained room for improvement.

SUMMARY

Upon investigation, it was found that the source of the leaks could often be associated to an edge of the bag which was manually closed at the plant upon mounting the bag to the steel frame, and could occur either along the length of the manually closed edge, or at the interface between the filter bag and the outlet pipe. Moreover, these regions were found to be prone to high levels of scale accumulations.

An edge closure system is presented herein wherein a portion of the closure edge of the filter bags leading to the outlet pipe aperture are provided with mating snapping closures formed of a resilient, anti-scaling, and process-resistant material such as EPDM rubber, allowing to sealingly close the length of the edge of the fabric leading to the outlet pipe aperture simply by engaging the male and female components of the snapping closures.

Moreover, an outlet pipe closure system is presented herein using a combination of a tongue mounted internally to one of the sides of the fabric forming the bag in a manner to be wrapable around at least a corresponding portion of the outlet pipe, and a fabric hood mounted externally and overlapping both sides of the bag at the outlet pipe aperture, which cooperates with the tongue to seal the interface between the outlet pipe and the bag when held in position using a fastener such as a wire or clamp.

In accordance with one aspect, there is provided a leaf filter bag for use with a mesh frame in a leaf filter of an alumina production plant, the leaf filter bag comprising: a first sheet portion adjacent a second sheet portion with a mesh frame spacing therebetween, the two adjacent sheet portions being connected at three closed edges and having a fourth closure edge openable to allow inserting a mesh frame into the mesh frame spacing through the closure edge, the closure edge having an outlet pipe aperture through which an outlet pipe of the mesh frame extends when the mesh frame is in the mesh frame spacing, the outlet pipe aperture having a first end adjacent a corner between the closure edge and one of the closed edges, and a second end spaced from the first end along the closure edge; a male snapping closure made integral to the first sheet portion along a portion of the closure edge leading to the outlet pipe aperture, and a female snapping closure made integral to the second sheet portion along the portion of the closure edge, the male snapping closure and the female snapping closure being made of EPDM rubber, the male snapping closure being snappingly engageable with the female snapping closure to form a seal along an entire length of the portion of the closure edge and disengageable therefrom to allow removing the mesh frame from the mesh frame spacing; a tongue having a tongue first end secured to an inner face of one of the sheet portions and to an end portion of one of the male snapping closure and the female snapping closure, adjacent the second end of the outlet pipe aperture, and a free tongue second end, the tongue being wrappable around at least a first portion of the outlet pipe; and a fabric hood secured externally to both the first sheet portion and the second sheet portion along and partially around the outlet pipe aperture, and protruding from the closure edge, the fabric band being wrappable around at least a complementary portion of the outlet pipe and cooperating with the tongue when held in position to form a seal between the leaf filter bag and the outlet pipe when held.

In accordance with another aspect, there is provided a leaf filter bag comprising: a first sheet portion adjacent a second sheet portion with a mesh frame spacing therebetween, the two adjacent sheet portions being connected at three closed edges and having a fourth closure edge openable to allow inserting a mesh frame into the mesh frame spacing through the closure edge, a male snapping closure made integral to the first sheet portion along a portion of the closure edge, and a female snapping closure made integral to the second sheet portion along the portion of the closure edge, the male snapping closure and the female snapping closure being made of a resilient, anti-scaling, and process-resistant material, the male snapping closure being snappingly engageable with the female snapping closure to form a seal along an entire length of the portion of the closure edge and disengageable therefrom to allow removing a mesh frame from the mesh frame spacing.

In accordance with another aspect, there is provided a leaf filter bag comprising: a first sheet portion adjacent a second sheet portion with a mesh frame spacing therebetween, the two adjacent sheet portions being connected at three closed edges and having a fourth closure edge openable to allow inserting a mesh frame into the mesh frame spacing through the closure edge, the closure edge having an outlet pipe aperture, and through which an outlet pipe of the mesh frame extends when the mesh frame is in the mesh frame spacing, the outlet pipe aperture having a first end adjacent a corner between the closure edge and a first one of the closed edges, and a second end spaced from the first end along the closure edge; a tongue having a first end secured to an inner face of one of the sheet portions, adjacent the second end of the outlet pipe aperture, and a free second end, the tongue being wrappable around at least a first portion of the outlet pipe; and a fabric hood secured externally to both the first sheet portion and the second sheet portion along and partially around the outlet pipe aperture, and protruding from the closure edge, the fabric hood being wrappable around at least a complementary portion of the outlet pipe and cooperating with the tongue when held in position to form a seal between the leaf filter bag and the outlet pipe when held.

In accordance with still another aspect, there is provided a method of installing a leaf filter bag on a mesh frame of a leaf filter, the method comprising: inserting the mesh frame into a mesh frame spacing between two sheet portions of the leaf filter bag, through a closure edge, in a position where an outlet pipe of the mesh frame protrudes from an outlet pipe aperture of the closure edge, and a fabric hood of the leaf filter bag protrudes from the two sheet portions around a first side of the outlet pipe; snappingly engaging a male closure affixed to a first one of the two sheet portions, with a female closure affixed to a second one of the two sheet portions, to form a seal along a portion of the closure edge leading to the outlet pipe aperture; wrapping a tongue affixed internally to one of the two sheet portions around at least a second side of the outlet pipe; and securing the hood and the tongue around the outlet pipe to form a seal between the outlet pipe and the leaf filter bag.

Many further features and combinations thereof concerning the present improvements will appear to those skilled in the art following a reading of the instant disclosure.

DESCRIPTION OF THE FIGURES

In the figures,

FIG. 6A is a side view showing a first embodiment of a filter bag having a closure system, the closure edge of the filter bag being open;

FIG. 6B is an oblique view of a second embodiment of a filter bag having a closure system, the closure edge of the filter bag being open;

FIG. 7 is a front view of the filter bag of FIG. 6A, where the closure edge is closed;

FIG. 8 shows a portion of the filter bag of FIG. 6A where two ends engaged male and female closures are permanently sewn together;

FIG. 9 includes FIG. 9A and FIG. 9B which are cross-sectional views showing the male and female closures of FIG. 6 disengaged, and engaged with one another.

DETAILED DESCRIPTION

Figure 1:
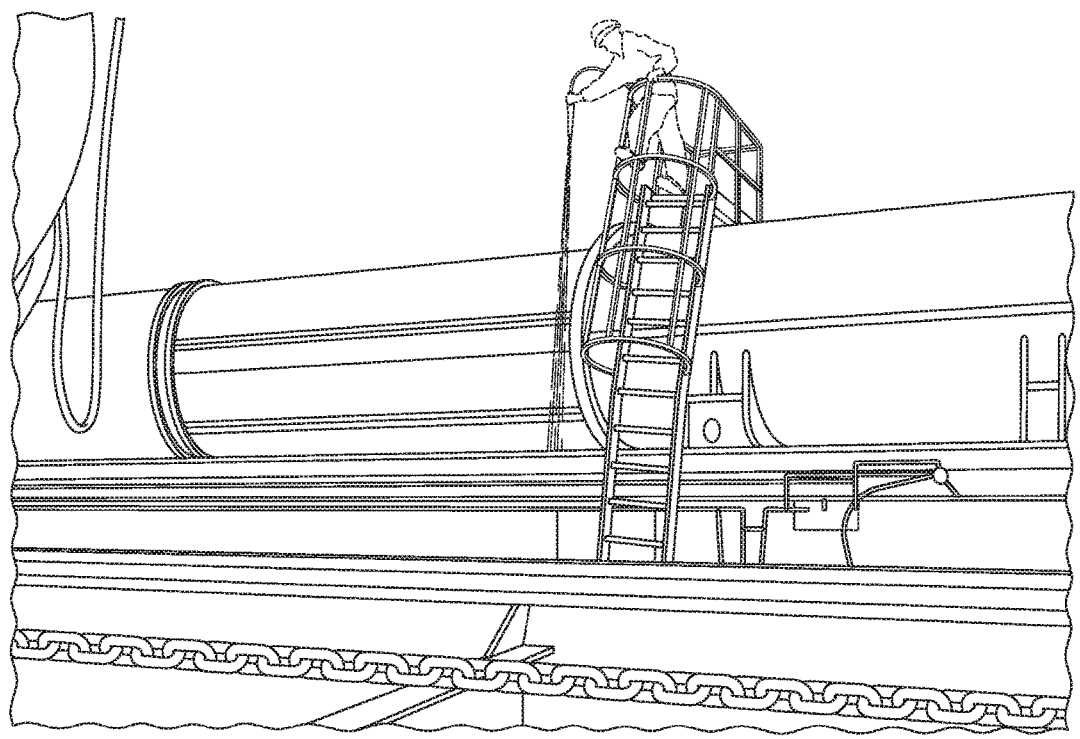
FIG. 1 shows an example of a leaf filter open for cleaning.
Figure 2:
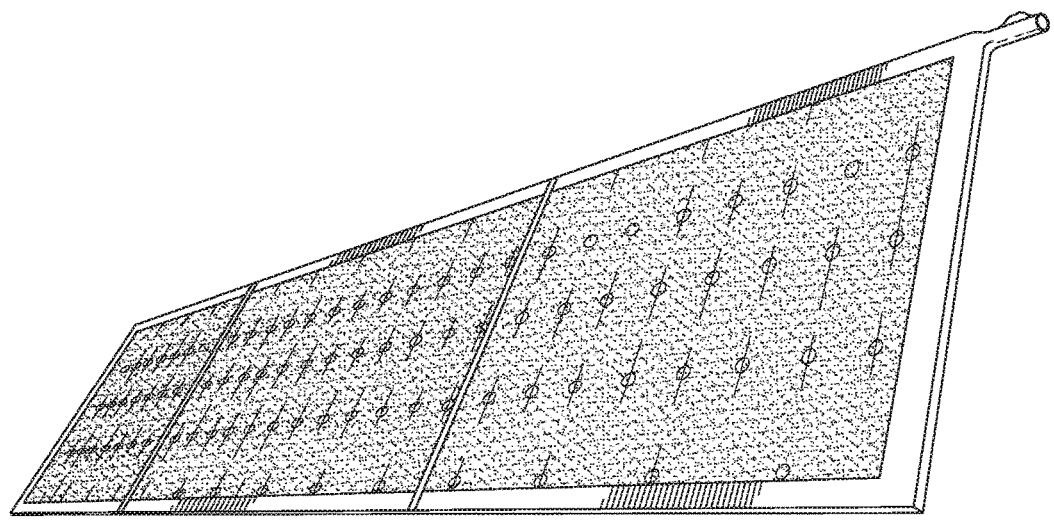
FIG. 2 shows an example of a mesh frame thereof.
Figure 3:
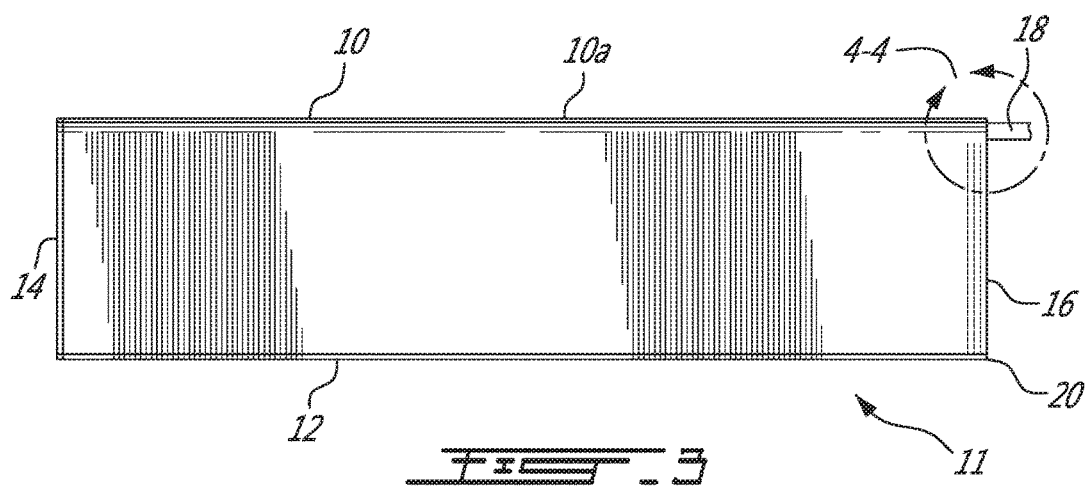
FIG. 3 shows an example of a filter bag with a mesh frame received therein, in accordance with the prior art.

Referring to FIG. 3, it was known to make the filter bags 11 using an appropriately sized square piece of fabric folded in half along a first longitudinal edge 10, forming a first closed edge 10a. It was also known to permanently close the second longitudinal edge 12 and one of the lateral edges (referred to herein as the distal edge 14) by sewing or hot welding, which was typically done at the fabric factory. Henceforth, a bag was formed having two adjacent sheet portions having a mesh frame spacing therebetween, and having three closed edges 10a, 12, 14 and one open edge (which can be referred to as the proximal edge 16) through which the mesh frame (FIG. 2) could be inserted at the alumina production plant.

Figure 4:
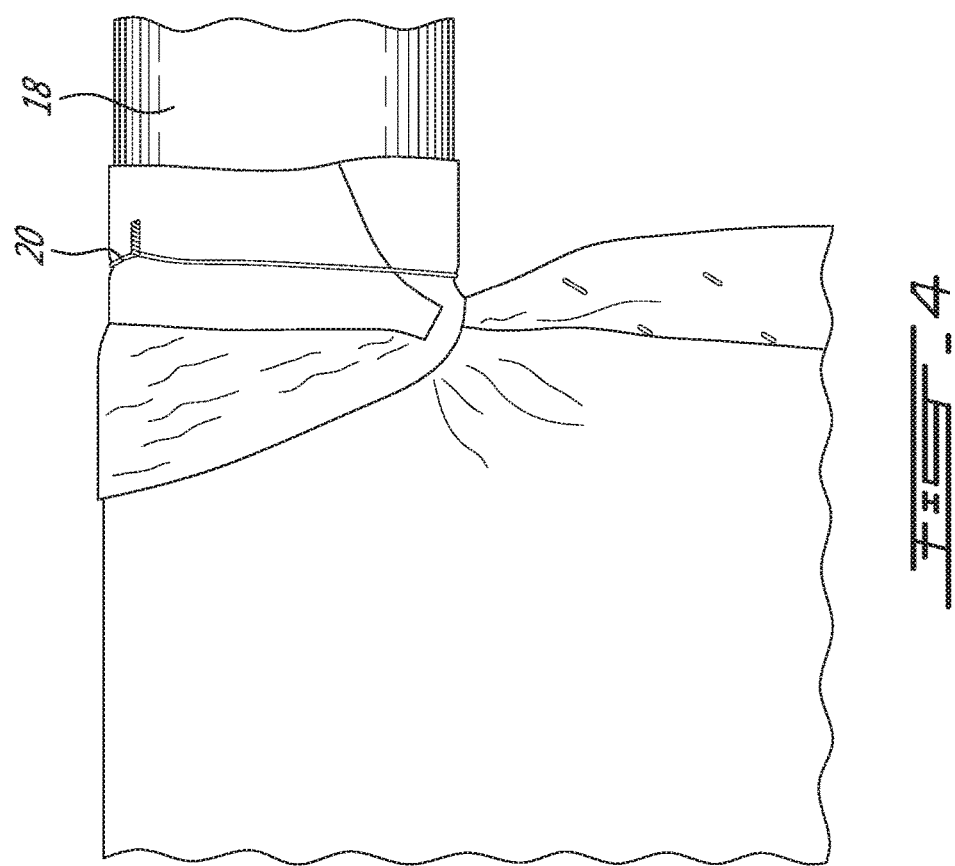
FIG. 4 is a portion of FIG. 3, enlarged.

Henceforth, it is at the alumina production plant that the seal was made along the proximal edge 16 and the outlet pipe 18. The closing of the proximal edge 16 was typically done by crumpling the fabric along the portion of the proximal edge 16 extending between a corner 20 and the outlet pipe aperture and stapling it closed. Then, a plurality of bands of fabric were cut from an extra bag using a knife, and one of these was wrapped around the outlet pipe 18 in a manner to overlap the bag, and tied into position using a twisted wire 20 in an effort to form a seal around the outlet pipe 18. This former approach is illustrated shown in FIG. 4.

These latter steps were done manually and the seal quality was often imperfect, in addition of being dependent upon the worker's skill. For illustrative purposes, it can be mentioned that for many years past, typical plants having trained workers closed many hundreds of leafs per year after only a few hours of production because leaks were detected. Since, the filtration fabric bags are typically replaced only every 4 to 6 weeks, such closed leafs represent not only wasted bags, but most importantly a significant amount of lost production.

Figure 5:
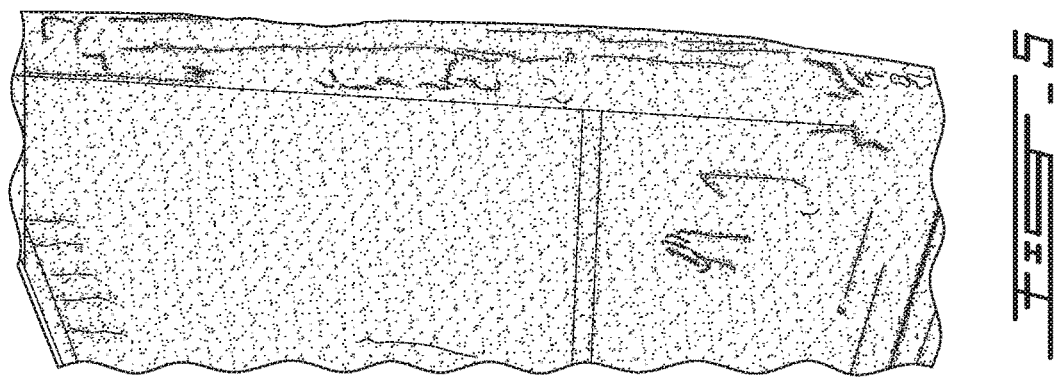
FIG. 5 shows a filter bag after use, showing scale accumulation.

Moreover, it will be understood that changing the bags involves removing the scale to an extent at least sufficient to allow removing the mesh frame from the bag. Removing the scale is a task which is resource-intensive. This was especially the case in the context where the crumpled length of the proximal edge 16 formed an environment which was prone to unusually large accumulations of scale, such as illustrated in FIG. 5.

Although the former approach had these drawbacks, it was generally considered as being the best approach, or the only suitable approach, for lack of an alternate satisfactory way to close the bag in a leak free manner, while maintaining it easy to install, and operable in the harsh environment of the Bayer process.

An embodiment of a filter bag shown in FIGS. 6A to 9 was devised which addresses the separate issues of A) closing the length of the bag leading to the outlet pipe in a satisfactory manner and with a reduced amount of scale accumulation and B) providing a satisfactory seal around the outlet pipe. More specifically, two different example embodiments which can provide a satisfactory seal around the outlet pipe are described, the first with reference to FIG. 6A, the second with reference to FIG. 6B.

The illustrated filter bag examples can still be manufactured in the same general configuration as it was formerly done, i.e. with a folded fabric forming two sheet portions with the mesh frame area therebetween, and by closing two of the remaining edges by permanently sewing the sheet portions to one another. However, the proximal edge is provided with two separate closure systems in these examples, and will therefore be referred to as the closure edge for convenience.

The first component 24 of the closure system 22 extends along the portion of the closure edge 26 extending between the outlet pipe aperture 28 and the corner 30 located away from the outlet pipe aperture 28, and includes a male snapping closure 32 attached to one of the fabric portions 36, and a female snapping closure 34 attached to the other one of the fabric portions 38. The male snapping closure 32 is engageable into the female snapping closure 34 along the entire length of the portion of the closure edge 26 in a manner to form a seal therealong when the mesh frame is in the bag 21. The Bayer process involves a very harsh, and caustic, environment. Henceforth, the material used must not only be resilient to allow the snapping action, but must also be process-resistant (i.e. resist to the harsh conditions of operation in hot (e.g. 104-112° C.) sodium hydroxide solution). Moreover, it was found that by using a material which was resistant to scaling (anti-scaling), impeded the accumulation of scale along the portion of the closure edge leading to the outlet pipe aperture, which highly facilitated the later removal operation of the bag, allowing to replace the bags more easily. EPDM rubber is considered a suitable material which offers anti-scaling features in addition to appropriate resilience and process-resistance, and was therefore selected as the material of the male and female snapping closures in the illustrated embodiment. Moreover, EPDM rubber can be extruded which can make a shape which is well adapted to the intended function. Preferably, the mating snapping closures are not only manually snappingly engageable to provide the seal, but are also manually disengageable to allow opening and replacing the bag in due course. As a security, the two sheet portions can still be stapled together or fastened with steel clips after the male and female closures are engaged, to obtain more confidence that the male and female closures will not open under back pressure, for instance.

An example of a satisfactory shape is shown more clearly in the cross-sectional view provided in FIGS. 9A and 9B, where the male portion 32 can be seen to have a male member 40 having knob-shaped cross-section, and the female portion 34 can be seen to have a female recess 42 having a corresponding knob-shaped cross-section. The male member 40 can be hollow in order to achieve satisfactory resilience. Other satisfactory shapes can be used in alternate embodiments as will be understood by persons skilled in the art, such as a triangular shape, for instance.

In this embodiment, the male and female snapping closures 32, 34 extend from a corner 30 (see FIG. 8) of the filter bag 21 between the closure edge 26 and the closed longitudinal edge 44 opposite the fold, to the outlet pipe aperture 28 (see FIG. 6A). The end of the male and female snapping closures 32, 34 at the corner 30 of the filter bag 21 can be permanently sewn to one another as shown in FIG. 8 in order to facilitate the lengthwise alignment of the snapping closures 32, 34 when they are manually snapped to one another. The other end of the male and female snapping closures 32, 34, shown at FIG. 6A, can have a special shape to accommodate the outlet pipe aperture 28 and the second component 48 of the closure system 22. The first component 24 of the closure system 22 can be used along the entire length of the portion of the closure edge 26 leading to the outlet pipe aperture 28, which can represent 90% of the length of the closure edge 26 for instance, whereas the second component 48 of the closure system 22 can be used at the outlet pipe aperture 28 to provide a seal between the filter bag 21 and the protruding outlet pipe 50 (see FIG. 7), which can represent 10% of the length of the closure edge 26 for instance.

In the embodiment shown in FIG. 6A, the second component 48 of the closure system 22 includes a hood 52 and a tongue 54, which are used in combination with a fastener 56 to form a seal around the protruding outlet pipe 50, into a sealed configuration shown in FIG. 7. The closure system 22 is shown in the open configuration in FIG. 6A, where the hood 52 and the tongue 54 are shown.

In the embodiment shown in FIGS. 6A and 7, it will be understood that the outlet pipe aperture 28 can be said to have a first end 60 which is aligned with a folded edge of the filter bag 21, and a second end 62 which is adjacent a corresponding end of the male and female snapping closures 32, 34. Accordingly, the outlet pipe 50 protruding therefrom can be said to have a first side 64 associated with the first end 60 of the outlet pipe aperture, and a second side 66 associated with the second end 62 of the outlet pipe aperture 28.

Still referring to FIGS. 6A and 7, the tongue 54 has a first end 68 which is attached internally to one of the fabric portions 36, and a free second end 70. The tongue 54 can wrap around a portion of the outlet pipe 50, along the second side 66 thereof, across a spacing 72 which the outlet pipe 50 forms between the first fabric portion 36 and the second fabric portion 38. In this specific embodiment, the first end 68 of the tongue is attached directly to a corresponding end of one of the snapping closures 32, in order to form a continuous seal therewith.

Still referring to FIGS. 6A and 7, the sheet hood 52 is affixed externally to the fabric of the filter bag 21, and is in the form of a band 52a which protrudes from the fabric body of the bag 21 in a manner to cover and be wrappable along a portion of the outlet pipe 50.

More specifically, the sheet hood 52 extends externally from an end of one of the snapping closures 32, along one of the fabric portions 36, around the fold, down the other fabric portion 38 and to the end of the other one of the snapping closures 34.

The sheet hood 52 can be made of the same or of a different material than the main fabric of the filter bag 21. Polypropylene, or polyamide 12, in the form of a woven or a non-woven fabric, can be used for example. Since the surface of the outlet pipe 50 can be rugged, a non-woven fabric (felt) can be preferred over a woven fabric. Alternately, the sheet hood can be made of EPDM rubber (ethylene propylene diene monomer rubber) in a laminated sheet form, which was selected in this embodiment since it also provided anti-scaling properties. The tongue can be made of non-woven polypropylene or polyamide 12, for example. The hood and the tongue can be held in place using a fastener such as shown in FIG. 7. The fastener can be a steel wire or a clamp, for instance.

In an alternate embodiment, shown in FIG. 6B, a first tongue 154 is made integral to the hood 152, both secured externally to the main fabric of the body of the filtration bag. Moreover, in that embodiment, a sealing fabric portion 174 can be provided in the form of a second tongue, as shown, between the closure portion 134 and the hood 152, internally of the main fabric of the body of the filtration bag and of the hood, to provide a suitable sealing efficiency, if required.

The shape, size, and position of the outlet pipe 50 can vary in alternate embodiments and the closure system can be adapted accordingly. For instance, if the outlet pipe is provided at mid-length of the closure edge, two tongues can be used, one on each side of the outlet pipe, the sheet hood can be made of two distinct components, and two snapping closures can be used, one on each side of the outlet pipe. Various other modifications are also possible.

Accordingly, the examples described above and illustrated are intended to be exemplary only. For instance, some embodiments can benefit from having only one component of the closure system as presented herein, rather than both, and the combined presence of two closure system components is thus optional. The scope is indicated by the appended claims.

What is claimed is:

1. A leaf filter bag for use with a mesh frame in a leaf filter of an alumina production plant, the leaf filter bag comprising:
    a first sheet portion adjacent a second sheet portion with a mesh frame spacing therebetween, the two adjacent sheet portions being connected at three closed edges and having a fourth closure edge openable to allow inserting a mesh frame into the mesh frame spacing through the closure edge, one of the edges having an outlet pipe aperture through which an outlet pipe of the mesh frame extends when the mesh frame is in the mesh frame spacing;
    a male snapping closure made integral to the first sheet portion along at least a portion of the closure edge, and a female snapping closure made integral to the second sheet portion and being complementary to the male snapping closure, the male snapping closure and the female snapping closure being made of EPDM rubber, the male snapping closure being snappingly engageable with the female snapping closure to form a seal along the closure edge and disengageable therefrom to allow removing the mesh frame from the mesh frame spacing;
    a tongue having a first end secured to one of the sheet portions, adjacent one of the first end and the second end of the of the outlet pipe aperture, and a free second end, the tongue being wrappable around at least a first portion of the outlet pipe; and
    a hood secured to the filter bag body partially around the outlet pipe aperture, and protruding from the filter bag body, the hood being wrappable around at least a complementary portion of the outlet pipe and cooperating with the tongue when held in position to form a seal between the leaf filter bag and the outlet pipe.

2. The leaf filter bag of claim 1 wherein the outlet pipe aperture is in the closure edge, adjacent the male snapping closure and female snapping closure, the male snapping closure and the female snapping closure leading to the outlet pipe aperture.

3. The leaf filter bag of claim 2 wherein the outlet pipe aperture has a first end adjacent a corner between the closure edge and one of the closed edges, and a second end spaced from the first end along the closure edge.

4. The leaf filter bag of claim 3 wherein the male snapping closure is permanently affixed to the female snapping closure at an end of the closure edge opposite the outlet pipe aperture.

5. The leaf filter bag of claim 1 wherein the tongue is sewn between one of the male snapping closure and the female snapping closure, and a corresponding one of the first sheet portion and the second sheet portion.

6. A leaf filter bag comprising:
    a first sheet portion adjacent a second sheet portion with a mesh frame spacing therebetween, the two adjacent sheet portions being connected at three closed edges and having a fourth closure edge openable to allow inserting a mesh frame into the mesh frame spacing through the closure edge,
    a male snapping closure made integral to the first sheet portion along a portion of the closure edge, and a female snapping closure made integral to the second sheet portion along the portion of the closure edge, the male snapping closure and the female snapping closure being made of a resilient, anti-scaling, and process-resistant material, the male snapping closure being snappingly engageable with the female snapping closure to form a seal along an entire length of the portion of the closure edge and disengageable therefrom to allow removing a mesh frame from the mesh frame spacing.

7. The leaf filter bag of claim 6 wherein the resilient, anti-scaling, and process-resistant material is EPDM rubber.

8. The leaf filter bag of claim 6 wherein the male snapping closure has an elongated member having a knob-shaped cross-section and the female snapping closure has an elongated recess having a corresponding knob-shaped cross-section.

9. The leaf filter bag of claim 6 wherein the portion of the closure edge extends from a corner located between one of the three closed edges and the closure edge, to an outlet pipe aperture adjacent an opposite corner located between an other one of the three closed edges and the closure edge.

10. A leaf filter bag comprising:
    a filter bag body having a first sheet portion adjacent a second sheet portion with a mesh frame spacing therebetween, having four edges at a periphery thereof with an outlet pipe aperture at one of the four edges through which outlet pipe aperture an outlet pipe of the mesh frame extends when the mesh frame is in the mesh frame spacing, the outlet pipe aperture having a first end and a second end opposite the first end;

a tongue having a first end secured to one of the sheet portions, adjacent one of the first end and the second end of the of the outlet pipe aperture, and a free second end, the tongue being wrappable around at least a first portion of the outlet pipe; and a hood secured to the filter bag body partially around the outlet pipe aperture, and protruding from the filter bag body, the hood being wrappable around at least a complementary portion of the outlet pipe and cooperating with the tongue when held in position to form a seal between the leaf filter bag and the outlet pipe when held.

11. The leaf filter bag of claim 10 further comprising a fastener adapted to hold the fabric band and tongue in the position around the outlet pipe during operation.

12. The leaf filter bag of claim 10 wherein the hood is secured externally to both the first sheet portion and the second sheet portion along, and partially around, the outlet pipe aperture.

13. The leaf filter bag of claim 10 wherein the first end of the tongue is secured to an inner face of one of the first sheet portion and the second sheet portion.

14. The leaf filter bag of claim 10 wherein the outlet pipe aperture is adjacent a corner between two of the four edges.

15. The leaf filter bag of claim 14 wherein a first one of the two edges is a folded edge, wherein the hood is sewn around the fold.

16. The leaf filter bag of claim 10 wherein the tongue is made of a non-woven fabric selected from the group consisting of polypropylene and polyamide 12.

17. The leaf filter bag of claim 10 wherein the hood is in the form of a sheet and is made of a material selected from the group consisting of EPDM, polypropylene and polyamide 12.

18. A method of installing a leaf filter bag on a mesh frame of a leaf filter, the method comprising:

inserting the mesh frame into a mesh frame spacing between two sheet portions of the leaf filter bag, through a closure edge, in a position where an outlet pipe of the mesh frame protrudes from an outlet pipe aperture of the closure edge, and a fabric hood of the leaf filter bag protrudes from the two sheet portions around a first side of the outlet pipe;

snappingly engaging a male closure affixed to a first one of the two sheet portions, with a female closure affixed to a second one of the two sheet portions, to form a seal along a portion of the closure edge leading to the outlet pipe aperture;

wrapping a tongue affixed internally to one of the two sheet portions around at least a second side of the outlet pipe; and securing the hood and the tongue around the outlet pipe to form a seal between the outlet pipe and the leaf filter bag.

* * * * *